Dec. 15, 1942.  A. L. KRONQUEST  2,305,090
METHOD OF AND APPARATUS FOR AUTOMATICALLY
SELECTING SLACK FILLED CONTAINERS.
Filed Jan. 2, 1940  3 Sheets-Sheet 1
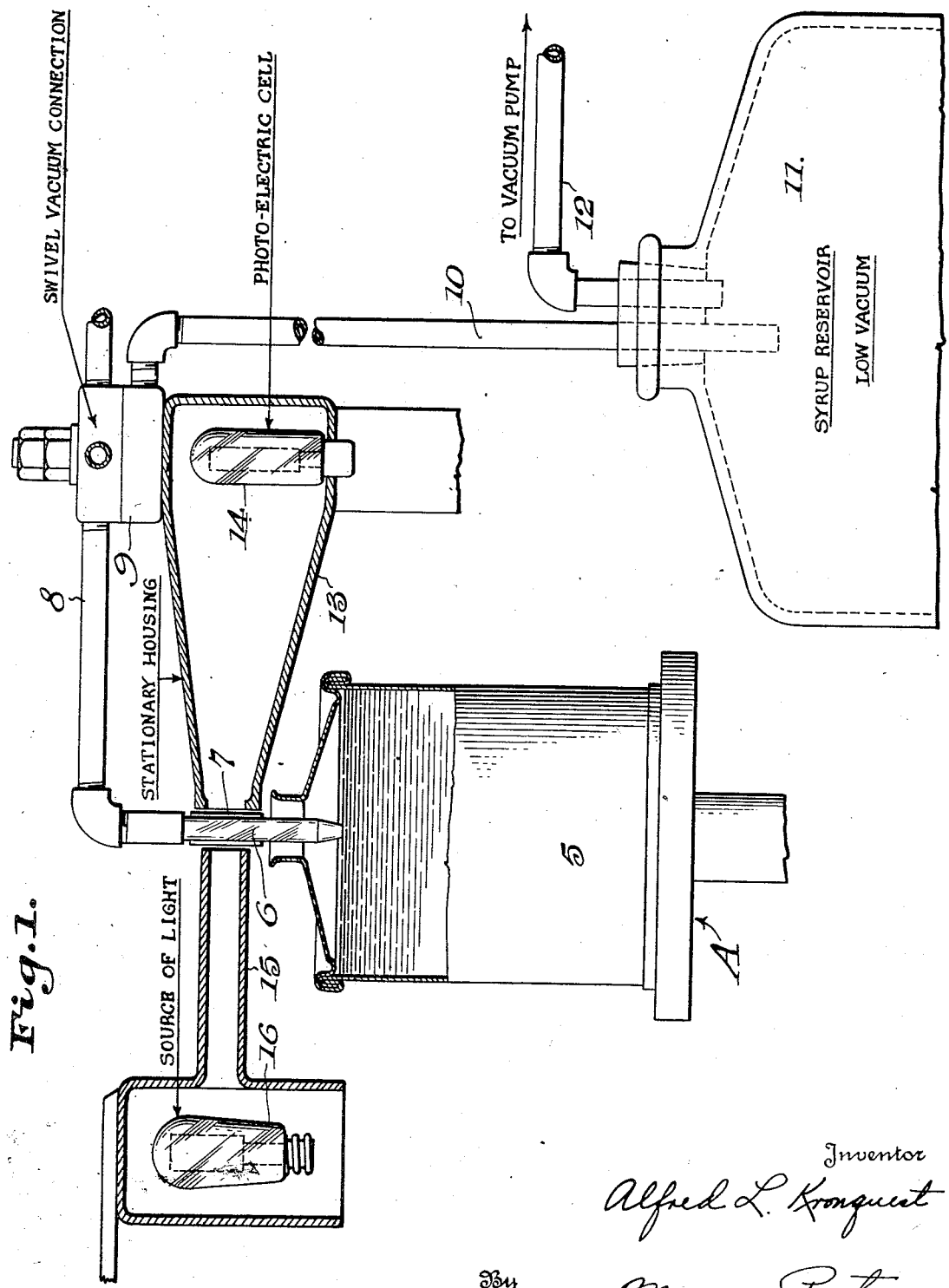

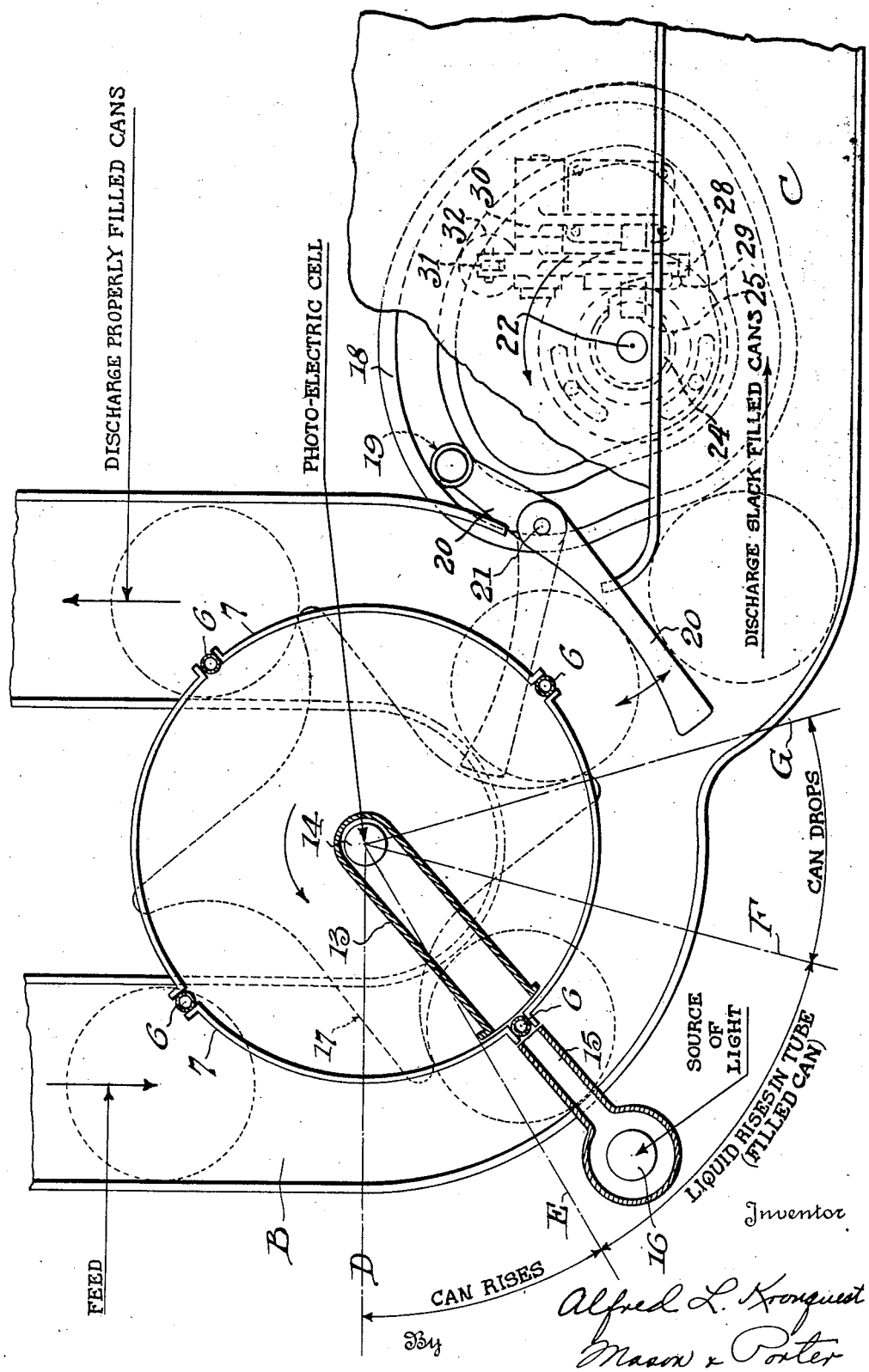

Dec. 15, 1942. A. L. KRONQUEST 2,305,090
METHOD OF AND APPARATUS FOR AUTOMATICALLY
SELECTING SLACK FILLED CONTAINERS
Filed Jan. 2, 1940 3 Sheets-Sheet 3

Inventor
Alfred L. Kronquest
By Mason & Porter
Attorneys

Patented Dec. 15, 1942

2,305,090

UNITED STATES PATENT OFFICE 2,305,090

METHOD OF AND APPARATUS FOR AUTOMATICALLY SELECTING SLACK FILLED CONTAINERS

Alfred L. Kronquest, Syracuse, N. Y., assignor to Continental Can Company, Inc., New York, N. Y., a corporation of New York Application January 2, 1940, Serial No. 312,185

6 Claims. (Cl. 226—22)

This invention relates to new and useful improvements in testing methods and equipment, and primarily seeks to provide a novel method of and apparatus for automatically selecting slack filled containers.

At the present time automatic filling machines are widely used to rapidly effect the filling of containers presented to the machine. Machines of this type are generally provided with means for regulating the volume of liquid entering the container to be filled in order to assure the injection of a substantially uniform volume of liquid into each container. It sometimes occurs that in spite of the volumetric adjustments mentioned slight variations in the volume of liquid received by the containers do occur and result in the provision of improperly filled containers. It, therefore, becomes desirable to provide a method of and apparatus for automatically selecting slack filled containers.

In the present instance it has been found desirable to regulate the volume of liquid admitted to the containers in such a manner that the containers will be slightly overfilled. Even with the fill adjusted to that degree, it sometimes occurs that certain containers will be slack filled and must be removed.

The method and apparatus embodied in the present invention have been developed to meet this problem.

Therefore, an object of this invention is to provide a method of automatically selecting slack filled containers which includes inserting a draw-off tube into a container until its lower end is disposed at the level of normal fill, then withdrawing through said tube any overfill in the container, and simultaneously detecting a column of liquid in said tube by light sensitive means to indicate that the amount of fill in the container is acceptable or to actuate ejecting mechanism should the liquid in said tube fail to rise a sufficient distance to become visible to thereby automatically select slack filled containers.

Another object of the invention is to provide a method of the character stated in which the container remains open to atmospheric pressure after the draw-off tube is inserted therein and a partial vacuum is drawn on the upper end of said tube to thereby effect removal of excess liquid from the container.

Another object of the invention is to provide a method of the character stated which includes the step of withdrawing excess liquid from a container by vacuum means and storing the liquid thus removed in a reservoir disposed in the vacuum line.

Another object of the invention is to provide novel apparatus for automatically selecting slack filled containers which includes a transparent draw-off tube insertable into and projecting thereabove, means for disposing the lower end of the tube at the line of normal fill, means for drawing off excess liquid through said tube, light sensitive means arranged to detect a column of liquid in said tube, and means actuated by said light sensitive means for ejecting slack filled containers evidenced by the failure of liquid to rise in said tube a sufficient distance to be detected.

Another object of the invention is to provide apparatus of the character described which includes a conveyor for supporting filled containers to be tested, a rotatable drum carrying a plurality of draw-off tubes, means for aligning said tubes with successively presented containers, and means for effecting a relative vertical movement between said containers and said tubes whereby the lower ends of said tubes will be positioned within said containers and disposed at the level of normal fill.

Another object of the invention is to provide apparatus of the character described which includes a rotary drum, means for mounting a plurality of transparent draw-off tubes on said drum so that a beam of light projecting inwardly along a radial of said drum can pass individually through successively presented tubes onto light sensitive means preferably disposed on the axis of the drum as said drum is rotated to thereby detect the presence of a column of liquid in said registering tube and to actuate ejecting mechanism should no liquid column be detected in said tube at the time of said registry.

With these and other objects in view which will more fully appear, the nature of the invention will be more clearly understood by following the description, the appended claims, and the several views illustrated in the accompanying drawings.

In the drawings:

Figure 1 is a somewhat diagrammatic illustration, in elevation, of apparatus embodying the invention and which may be employed in performing the method of this invention.

Figure 2 is a somewhat diagrammatic illustration, in plan, of the apparatus and indicates the relative positions of the conveyor, container aligning means, detecting means, and ejecting mechanism.

Figure 3 is a fragmentary vertical sectional view illustrating in greater detail the testing and ejecting means and the controls for the latter.

Figures 4, 5:
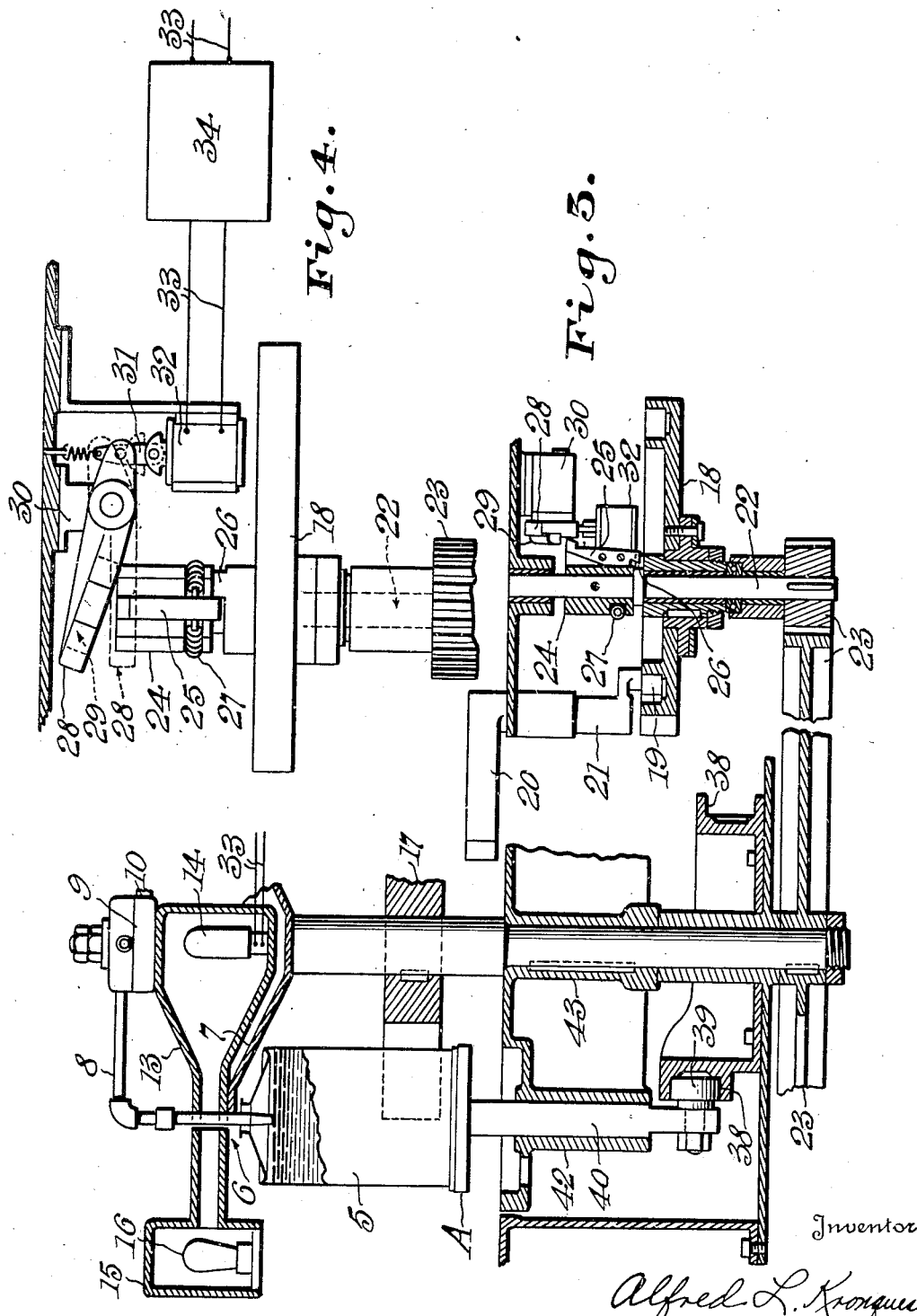
Figure 4 is a fragmentary face view illustrating the ejecting cam and the controlling solenoid and clutch combination.

The method herein described has to do with the grading of liquid filled containers to prevent shipping of subnormally or slack filled containers and consists in first bringing a liquid filled container into operative or testing relation to a combined indicator and draw-off tube in such a manner that the lower end of the tube will be disposed at the level of normal fill in the container, then withdrawing excess liquid from said container through the tube and simultaneously detecting the presence of a column of liquid in said tube through the medium of light sensitive means whereby ejecting mechanism will be actuated should the liquid in said tube fail to rise to a height sufficient to become visible whereby slack filled containers will be automatically rejected, and finally moving said container and said draw-off tube out of testing relationship.

One form of apparatus which may be used in a practical application of the method just described, is somewhat diagrammatically illustrated in Figures 1 and 2 of the drawings.

In the particular embodiment of the invention herein disclosed, a container 5 is adapted to be moved into testing position through the medium of a positioning table A. A plurality of transparent vertically disposed, combined indicating and draw-off tubes 6 are mounted on a rotatable drum 7 in such a manner that a beam of light projected along a radial of the drum can pass through successively presented tubes. The upper ends of the respective tubes 6 are connected to vacuum pipes 8 having their other ends connected to a vacuum swivel connection 9 which receives a source of vacuum through the medium of a pipe 10, a liquid reservoir 11, and a pipe 12 connected directly to a source of vacuum not shown.

A stationarily disposed housing 13 containing a photo-electric cell 14 is rigidly mounted within the defined limits of the drum 7 and has its longitudinal axis disposed radially from the axis of rotation of said drum. A light housing 15 containing a source of light 16 is rigidly mounted without the defined limits of the drum 7 and has its longitudinal axis disposed in alignment with the axis of the housing 13. It will be observed that the opposing ends of the respective housings 13 and 15 are spaced a distance sufficient to allow passage of the peripheral portions of said drum and the successively presented tubes 6 therebetween.

The containers are adapted to be presented to the testing station defined by the position of the light sensitive means through the medium of a main conveyor indicated at B. The specific alignment of the moving containers with the traveling and successively presented draw-off tubes 6 is effected through the medium of a rotatable star wheel 17 adapted to be driven in properly timed relation to said conveyor and said rotatable drum through any suitable mechanisms, as by directly connected for rotation with the drum as shown in Figure 3.

The light sensitive means which include the housings 13 and 15, the photo-electric cell 14 and the light source 16 provide control means for a suitable container ejecting mechanism whereby automatic removal of slack filled containers can be effected. This ejecting mechanism may include a cam 18 and a cam follower 19 which is connected to one end of a container diverting arm 20 pivoted intermediate its ends as at 21. The diverting arm 20 is disposed adjacent the outer peripheral portion of the main conveyor B and is adapted to block off the return portion of that conveyor and divert a container from its normal path of travel on the conveyor to a path of travel which places it onto an ejecting conveyor indicated at C. The ejecting mechanism is preferably arranged in such a manner that the cam 18 is adapted to make one revolution per each container presentation and operates only when a driving clutch is actuated by the light sensitive means. This control equipment is best illustrated in Figures 2, 3, and 4 in which the cam 18 is shown as loosely surrounding a shaft 22 which is constantly driven through transmission gearing 23. A clutch head 24 is secured to the shaft 22 and is equipped with a displaceable, pivotally mounted driving finger 25 which is engaged with a driving lug 26 projecting upwardly from the hub of the cam whenever the finger 25 is in the position illustrated in Figure 3, toward which position it is constantly urged by the spring 27. The control equipment includes a driving finger displacing member 28 having a finger engaging cam portion 29 and which is pivotally supported intermediate its ends on a bracket 30. The other end of the member 28 is link connected at 31 to the core of a solenoid 32, the solenoid being electrically connected as at 33 with the photo-electric cell 14 through conventional standard control circuit connections diagrammatically indicated at 34. The normal position of the displacing member 28 is shown in dotted lines in Figure 4. In this position it will displace the driving finger 25 each time it approaches the driving lug 26 so that it will pass the lug without imparting movement to the cam 18. However, each time a slack fill is detected, as aforesaid, the photo-electric cell 14 will act to energize the solenoid 32 and displace the member 28 as shown in full lines in Figure 4, thus permitting the driving finger 25 to engage the lug 26 and impart a single revolution to the cam 18 effective to place the ejector arm 20 for ejecting the slack filled container.

In operation, a line of containers enters the feed side of the main conveyor B and are successively engaged by the fingers of the star wheel 17 which is rotating at the same angular speed as the drum 7 to thereby align the axis of each container with the associated tube 6. At point D on the conveyor indicated in Figure 2 of the drawings, and before the finger of the star wheel has engaged a container, the container begins to rise under the influence of elevating mechanism which in this illustration comprises a cam track 38 which is engaged by the rollers 39 attached to the lower ends of the stems 40 which depend from the individual container supporting pads A and which are vertically reciprocable in bearings 42 formed in the rotor 43 forming a part of the container conveying means. The timing of the lifting and lowering of the pads A is diagrammatically indicated at D, E, F, and G in Figure 2.

When the container has reached point E in its travel, it will have gained a position of maximum elevation and will be disposed in testing relation to the associated tube 6. At the same time the container reaches point E a vacuum is admitted to the pipe 8 connected with the associated tube 6 to thereby draw off excess liquid from the container and lower the level of fill to normal.

In a very short angular distance after the container reaches point E the glass tube 6 associated therewith in testing position will come into registry with the light beam between the light source 16 and the photo-electric cell 14. If a container holds an excess of liquid, that excess of liquid is drawn up in the respective tube at this position of travel of the container and forms an opaque column in the tube 6 effective to interrupt the light beam extending between the light source and the photo-electric cell thereby indicating that the container is not slack filled. However, should there be no column of liquid in the tube at this point the light beam extending between the light source and the photo-electric cell will not be interrupted and therefore the ejecting mechanism which is controlled by the light sensitive means will be actuated to position the diverting arm 20 across the discharge portion of the main conveyor.

After the container and associated testing tube pass the position of registry with the light beam and when it reaches the point F the container begins to drop to the normal level of the conveyor and reaches that normal level at point G.

Containers not slack filled pass on through the discharge portion of the main conveyor. However, if containers are slack filled, that condition is detected at the testing station and the diverting arm 20 barricades the return side of the main conveyer B and the container is forced to enter the ejecting conveyor C which has been provided for conveying slack filled containers.

Thus it will be seen that the invention herein described provides a novel method of and apparatus for automatically selecting slack filled containers employing a transparent draw-off tube insertable into and projecting above said container, means for disposing the lower end of the tube at the line of normal fill, means for drawing off excess liquid through said tube, light sensitive means arranged to detect a column of liquid in said tube, and means actuated by said light sensitive means for ejecting slack filled containers evidenced by the failure of liquid to rise in said tube a sufficient distance to be detected.

It is of course to be understood that the details of structure and arrangement of parts may be variously changed and modified without departing from the spirit and scope of my invention.

I claim:

1. The method of automatically selecting slack filled containers which consists in inserting a vertically disposed transparent indicating tube into a container with the lower end of said tube disposed at the level of normal fill, then creating a pressure differential between the surface of the liquid in the container and the upper end of said tube thereby forcing a liquid column into said tube to lower the level of fill in the container to normal, utilizing light sensitive means to detect the presence of a liquid column in said tube and displaced by the pressure differential from the container to thereby indicate a status of normal fill or a state of slack fill evidenced by failure of the liquid to rise in the tube to a sufficient height to become visible, drawing off the displaced column of liquid, and automatically ejecting the container after the container and tube have been returned to the non-testing position should a state of slack fill be indicated.

2. In a method of automatically selecting slack filled containers the steps of drawing off excess liquid from a container through a transparent tube to reduce the volume of liquid to the normal level and, while so drawing the liquid through said tube, utilizing light sensitive means to detect the presence of the liquid column in said tube to thereby indicate a status of normal fill or a state of slack fill evidenced by failure of the liquid to rise in the tube to a sufficient height to obstruct the light sensitive means, and automatically ejecting the container under control of said light sensitive means should a state of slack fill be indicated.

3. In apparatus for automatically selecting slack filled containers, a transparent draw-off tube insertable into a container and projecting thereabove, means for disposing the lower end of said tube at the line of normal fill of the container, means for drawing off excess liquid through said tube, light sensitive means arranged to detect the presence of a column of liquid in said tube, and means actuated under control of light sensitive means for ejecting slack filled containers detected by failure of a liquid column to rise in said tube to a sufficient height to obstruct the light sensitive means.

4. In apparatus for automatically selecting slack filled containers, a rotary drum, a plurality of transparent draw-off tubes mounted on said drum, said tubes being mounted so that a beam of light projecting radially with respect to the axis of said drum can pass individually through said tubes, means for progressively aligning said tubes with successively presented containers, means for effecting a relative vertical movement between said containers and said tubes as each container and tube complement is brought into alignment whereby the lower ends of said tubes will be positioned within said containers and disposed at the level of normal fill, means for drawing off excess liquid from said containers through said tubes, slack filled container ejecting means, and stationarily disposed light sensitive means adapted to register with successively presented tubes as said drum is rotated to thereby detect the presence of a column of liquid in each registering tube and to control actuation of ejecting mechanism should no liquid column be detected in a given registering tube at the time of said registry.

5. In apparatus for automatically selecting and ejecting slack filled containers from among filled containers some of which may be slack filled and some over-filled, a conveyor for supporting filled containers to be tested, a rotor, a testing station, a plurality of surplus draw-off tubes mounted on said rotor, means for aligning said tubes with containers successively presented at said station, means for effecting a relative vertical movement between said containers and said tubes at said station whereby the lower ends of said tubes will be positioned within said containers and disposed at the level of normal fill, means for drawing off excess liquid from said containers through said tubes, means at said station for detecting conditions of slack fill in containers at said station, an ejecting station disposed remotely from said testing station, and means at said ejecting station and automatically effective under control of said slack fill detecting means for ejecting at said ejecting station each container detected as slack filled at said testing station.

6. In apparatus for automatically selecting and ejecting slack filled containers from among filled containers some of which may be slack filled and some over-filled, a conveyor for supporting filled containers to be tested, a rotor, a testing station, a plurality of surplus draw-off tubes mounted on said rotor, means for aligning said tubes with containers successively presented at said station, means for effecting a relative vertical movement between said containers and said tubes at said station whereby the lower ends of said tubes will be positioned within said containers and disposed at the level of normal fill, means for drawing off excess liquid from said containers through said tubes, means at said station for detecting conditions of slack fill in containers at said station, an ejecting station disposed remotely from said testing station, and means at said ejecting station and automatically effective under control of said slack fill detecting means for ejecting at said ejecting station each container detected as slack filled at said testing station, said draw-off tubes being transparent, and said testing means including light sensitive means cooperatively associated with said tubes.

ALFRED L. KRONQUEST.